US 6,665,033 B2
*Dec. 16, 2003

(12) United States Patent
Callegari et al.

(10) Patent No.: US 6,665,033 B2
(45) Date of Patent: *Dec. 16, 2003

(54) METHOD FOR FORMING ALIGNMENT LAYER BY ION BEAM SURFACE MODIFICATION

(75) Inventors: Alessandro C. Callegari, Yorktown Heights, NY (US); Praveen Chaudhari, Briarcliff Manor, NY (US); Fuad E. Doany, Katonah, NY (US); James P. Doyle, Bronx, NY (US); Eileen A. Galligan, Fishkill, NY (US); James H. Glownia, Somers, NY (US); Gareth G. Hougham, Ossining, NY (US); James A. Lacey, Mahopac, NY (US); Shui-Chih Lien, Briarcliff Manor, NY (US); Minhua Lu, Mohegan Lake, NY (US); Alan E. Rosenbluth, Yorktown Heights, NY (US); Kei-Hsiung Yang, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 09/726,951

(22) Filed: Nov. 30, 2000

(65) Prior Publication Data

US 2002/0063830 A1 May 30, 2002

(51) Int. Cl.⁷ .................. G02F 1/1337; G02F 1/133; C07C 1/00
(52) U.S. Cl. .................. 349/123; 349/31; 349/124; 349/125; 204/157.15
(58) Field of Search .................. 349/94, 31, 123, 349/124, 125; 430/320, 321, 396, 22; 204/157.15

(56) References Cited

U.S. PATENT DOCUMENTS

| | | | | |
|---|---|---|---|---|
| 5,030,322 A | * | 7/1991 | Shimada et al. | 204/192.3 |
| 5,710,608 A | * | 1/1998 | Nakabayashi et al. | 349/123 |
| 5,770,826 A | | 6/1998 | Chaudhari et al. | 204/157.15 |
| 6,020,946 A | * | 2/2000 | Callegari et al. | 349/124 |
| 6,061,114 A | * | 5/2000 | Callegari et al. | 349/125 |
| 6,061,115 A | * | 5/2000 | Samant et al. | 204/157.15 |
| 6,331,381 B1 | * | 12/2001 | Chaudhari et al. | 349/124 |
| 6,485,614 B2 | * | 11/2002 | Katoh et al. | 204/157.15 |
| 2001/0025826 A1 | * | 10/2001 | Pierson et al. | 216/55 |
| 2001/0041380 A1 | * | 11/2001 | Samant et al. | 438/29 |
| 2002/0001057 A1 | * | 1/2002 | Chaudhari et al. | 349/124 |
| 2002/0063055 A1 | * | 5/2002 | Katoh et al. | 204/192.32 |

FOREIGN PATENT DOCUMENTS

JP 04 063323 A 2/1992

OTHER PUBLICATIONS

Tschersich et al., "Formation of an Atomic Hydrogen Beam by a Hot Capillary," Journal of Applied Physics, vol. 84, No. 8, pp. 4065–4070, Oct. 1998.

Harvey et al., "Semiconductor Detector for the Selective Detection of Atomic Hydrogen," American Institute of Physics, pp. 1117–1120, May 1983.

"Ion Bombardment of Polymide for the Alignment of Liquid Crystals", IBM Technical Disclosure Bulletin, IBM Corp., New York, U.S. vol. 34, No. 4B, Sep. 1, 1991, pp. 80–82.

* cited by examiner

*Primary Examiner*—Tarifur R. Chowdhury
(74) *Attorney, Agent, or Firm*—F. Chau & Associates, LLP; Robert M. Trepp

(57) ABSTRACT

A method for preparing an alignment layer surface provides a surface on the alignment layer. The surface is bombarded with ions, and reactive gas is introduced to the ion beam to saturate dangling bonds on the surface. Another method for preparing an alignment layer surface provides a surface on the alignment layer. The surface is bombarded with ions and quenched with a reactive component to saturate dangling bonds on the surface.

6 Claims, 9 Drawing Sheets

METHOD FOR FORMING ALIGNMENT LAYER BY ION BEAM SURFACE MODIFICATION

BACKGROUND OF THE INVENTION

1. Field of the Invention

The present invention relates to liquid crystal displays, and more particularly to methods for forming a stable alignment layer created by ion beam irradiation of a carbon film.

2. Description of the Related Art

Liquid crystal (LC) material employed in liquid crystal displays typically rely on alignment layers to establish a stable pretilt angle and other parameters such as anchoring energy for the liquid crystal material. Typically, the alignment of the liquid crystals for flat panel liquid crystal displays (LCD) is accomplished by placing a thin film of LC material on a mechanically rubbed polyimide film coated on a suitable substrate. Limitations imposed by the mechanical rubbing method (e.g., creating multiple domains for improving the viewing angle) in conjunction with the difficulty of optimizing polymer materials (e.g., polymers that avoid image sticking) make it highly desirable to use alternative materials and a non-contact LC alignment method.

There are a number of different methods/materials which have been shown to create LC alignment besides rubbing, for example, a stretched polymer, a Langmuir Blodgett film, a grating structure produced by microlithography, oblique angle deposition of silicon oxide, and polarized ultraviolet (UV) irradiation of a polymer film.

Non-contact methods to replace rubbing are described in commonly assigned U.S. Pat. No. 5,770,826, which describes a particularly attractive and versatile LC alignment process based on ion beam irradiation of a polyimide surface. The method places the LCs on a polyimide surface which has been bombarded with low energy (about 100 eV) $Ar^+$ ions. This process has many characteristics which make it suitable for the manufacture of LC displays. This method has been extended to include diamond-like carbon (DLC), amorphous hydrogenated silicon, SiC, $SiO_2$, glass, $Si_3N_4$, $Al_2O_3$, $CeO_2$, $SnO_2$, and $ZnTiO_2$ films as described in commonly assigned U.S. Pat. No. 6,020,946. Another method for creating an LC alignment layer in a single deposition process has been described in commonly assigned U.S. Pat. No. 6,061,114.

Ion-beam treatment on DLC films (IB/DLC) for the alignment of liquid crystals has many advantages over conventional rubbed polyimide alignment, such as, non-contact processing, alignment uniformity, etc. Usually, DLC films of about 50 angstroms thick are deposited by plasma enhanced chemical vapor deposition (PECVD), and followed by Ar ion beam irradiation. It is believed that the Ar ion beam destroys the amorphous-carbon rings which have a large collision cross section to the ion beam. The amorphous-carbon rings which have a small or zero collision cross section to the ion beam are preserved. The average direction of the remaining carbon rings align the liquid crystal and generate a pretilt angle. The pretilt angle of IB/DLC alignment is not stable. The pretilt angle tends to decrease when the IB/DLC substrates are in contact with moisture or other components in air. The pretilt angle decreases as a function of storage time in vacuum-sealed LC cells with IB/DLC alignment. In addition, the pretilt angle is not stable under ultra-violet (UV) or violet irradiation. After ion-beam treatment, the surface of the DLC films are very active due to the ion-beam induced free radicals on the DLC surface. These free radicals tend to react with many chemical species in contact with them. This reaction may change the surface chemistry of the DLC film or change the orientation the carbon rings. As a result, the pretilt angle will degrade.

Therefore, a need exists for a non-contact alignment layer with a stable pretilt angle for use with liquid crystal displays.

SUMMARY OF THE INVENTION

Methods for inducing chemical changes to an alignment layer surface are described herein. Surface modification to an alignment layer surface, such as for example, a diamond like carbon (DLC) surface is carried out to enhance time stability of liquid crystal pretilt angle and further to fine-tune the pretilt angle and other properties related to the alignment of liquid crystal (LC) through interaction of the liquid crystal with the alignment layer surface.

Surface modification in accordance with the present invention may be grouped into several general categories for illustrative purposes. One category includes contemporaneous treatment of the surface alignment layer during the ion beam (IB) treatment. Reactive gas components may be added to the Argon gas normally used for the ion beam process, or the Argon gas may be replaced all together with reactive gas components. Such treatments could include, for example, hydrogen gas, fluorine gas, nitrogen gas, oxygen gas or larger molecules, such as, tetrafluoromethane. Free radicals and other types of reactive sites generated on the alignment layer surface (often called dangling bonds) would be immediately available for reaction with reactive species in the same environment. Dangling bonds on the surface would be able to be satisfied faster and in a controllable fashion using this method. Further, the reactive gases themselves may be activated by bond cleavage in the chamber creating in-situ atomic species such as, for example, atomic hydrogen or atomic nitrogen.

Another category includes post IB treatment of the alignment layer. A wet chemical, plasma, atom beam, or gas phase treatment may be employed to react with dangling bonds after IB treatment. Dangling bonds or other reactive sites created during the IB treatment could be reacted with these species resulting in a reproducible surface chemistry while maintaining the surface anisotropy desired for subsequent liquid crystal alignment.

A method for preparing an alignment surface of an ion beam processed alignment layer is described. Either concurrently with or subsequent to ion beam treatment of the surface, other chemical species are introduced and permitted to react to passivate dangling bonds. This stabilizes liquid crystal in a display to resist long term change and additionally permits fine-tuning of surface character and fine-tuning of the interaction between the liquid crystal and the prepared surface. Treatments include addition of gasses simultaneously with ion beam processing, or subsequently with gasses, plasmas, atom gun sources, or liquids.

A method for preparing an alignment layer surface, in accordance with the invention, includes providing a surface on the alignment layer, bombarding the surface with ions; and introducing reactive gas to the ion beam to saturate dangling bonds on the surface.

In other methods, the alignment layer may include diamond like carbon. The step of introducing reactive gas components may include the step of introducing one or more of nitrogen, hydrogen, oxygen, fluorine, silane, tetrafluoromethane as the reactive gas. The step of bombarding the surface with ions may include the step of bombarding the surface with Argon ions and reactive gas ions.

Another method for preparing an alignment layer surface, in accordance with the invention, includes the steps of providing a surface on the alignment layer, bombarding the surface with ions and quenching the surface with a reactive component to saturate dangling bonds on the surface.

In other methods, the alignment layer may include diamond like carbon. The step of quenching the surface with a reactive component may include the step of quenching the surface with a reactive gas to saturate dangling bonds on the surface. The reactive gas may include at least one of hydrogen, nitrogen, carbon dioxide, oxygen and water vapor. The step of quenching the surface with a reactive component may include the step of quenching the surface with a reactive liquid to saturate dangling bonds on the surface. The reactive liquid may include at least one of alcohol, water, hydrogen peroxide, carbon dioxide-saturated water, and liquid crystal. The step of quenching the surface may include the step of introducing atomic species to the surface by employing an atom gun. The atomic species may include one of hydrogen, nitrogen and oxygen.

Another method for preparing an alignment layer surface for liquid crystal displays, in accordance with the present invention, includes the steps of providing a diamond like carbon surface, bombarding the surface with ions from an ion beam, and saturating dangling bonds on the surface caused by the bombarding step.

In other methods, the step of bombarding may include the step of introducing a reactive gas to the ion beam. The reactive gas may include at least one of nitrogen, hydrogen, oxygen, fluorine silane and tetrafluoromethane. The step of bombarding the surface with ions may include the step of bombarding the surface with Argon ions and reactive gas ions. The step of saturating dangling bonds may include the step of quenching the surface with a reactive gas to saturate dangling bonds on the surface. The reactive gas may include at least one of hydrogen, nitrogen, carbon dioxide, oxygen and water vapor. The step of saturating dangling bonds may include the step of quenching the surface with a reactive liquid to saturate dangling bonds on the surface. The reactive liquid may include at least one of alcohol, water, hydrogen peroxide, carbon dioxide-saturated water, and liquid crystal. The step of saturating dangling bonds may include the step of introducing atomic species to the surface by employing an atom gun. The atomic species may include one of hydrogen, nitrogen and oxygen.

These and other objects, features and advantages of the present invention will become apparent from the following detailed description of illustrative embodiments thereof, which is to be read in connection with the accompanying drawings.

DESCRIPTION OF DRAWINGS

The invention will be described in detail in the following description of preferred embodiments with reference to the following figures wherein.

DETAILED DESCRIPTION OF PREFERRED EMBODIMENTS

The present invention includes methods of surface modification to stabilize and otherwise fine tune ion beam treated surfaces. Surface treated in accordance with the invention may include, for example, diamond like carbon (DLC), amorphous hydrogenated silicon, SiC, $SiO_2$, glass, $Si_3N_4$, $Al_2O_3$, $CeO_2$, $SnO_2$, indium tin oxide (ITO) and $ZnTiO_2$ films or other materials employed in the ion beam treated alignment layers. Surface modification is achieved by saturating dangling bonds on the surface of the ion beam (IB) film. The IB film may be modified in a plurality of ways in accordance with the present invention. In preferred embodiments, surface modification and/or dangling bond saturation may be performed during IB treatment by introducing other reactive species originating from, for example, nitrogen ($N_2$), fluorine ($F_2$), tetrafluoromethane ($CF_4$), hydrogen ($H_2$), silicon (e.g., from silane), carbon (C), Oxygen ($O_2$). These species may be mixed with or replace Ar in an ion beam. In another embodiment, surface modification and/or dangling bond saturation may be performed after IB treatment, for example, by quenching a substrate including the IB film in an environment of a gas or liquid (e.g., carbon dioxide, water/carbon dioxide solution, etc.). In one preferred embodiment of the present invention, a DLC film is treated by a $N_2$ ion beam instead of an Ar ion beam, which generates a more stable LC alignment under prolonged exposure of, for example, violet or blue light. Other embodiments include employing a directed source of atomic species (e.g., an atomic gun) to apply reactive species to a surface of the alignment layer to saturated dangling bonds.

Figure 1:
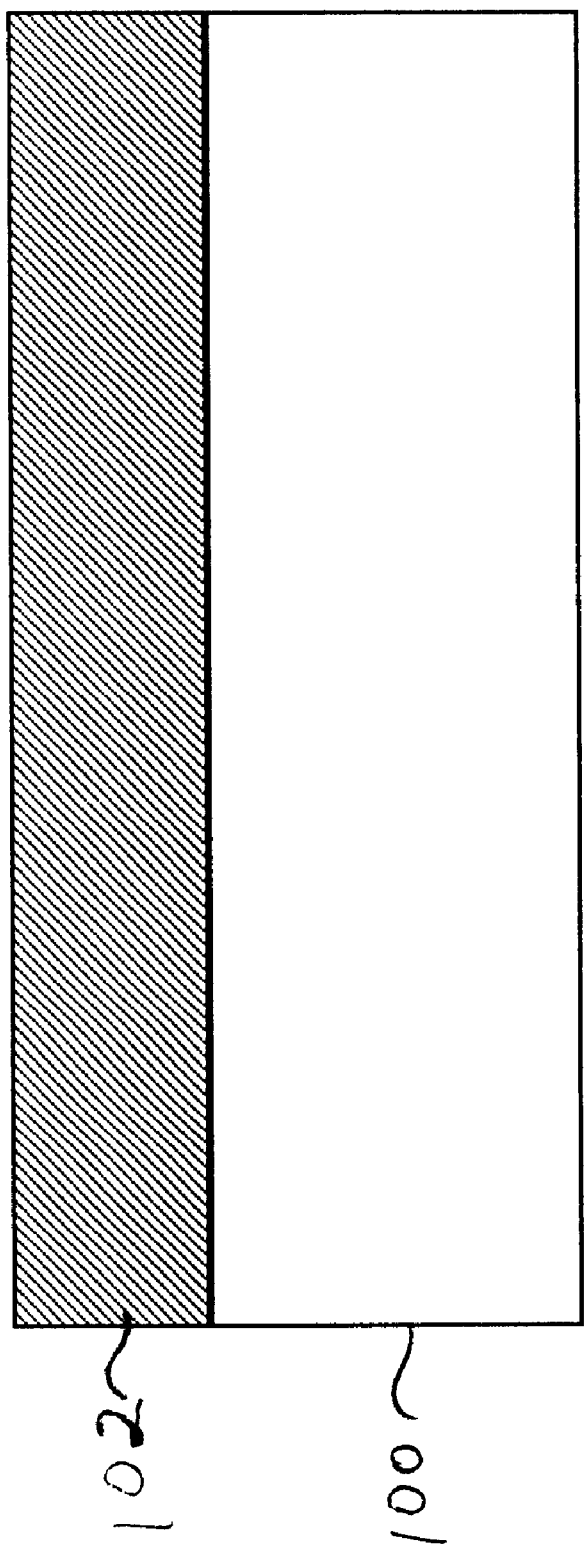
FIG. 1 is a cross-sectional view of a plate having a conductive layer formed thereon in accordance with the present invention.

Referring now in detail to the figures in which like numerals represent the same or similar elements and initially to FIG. 1, a plate 100 is shown for use in a liquid crystal display. Plate 100 may include a glass substrate or other transparent substrate, such as a plastic substrate. Plate 100 includes a conductive layer 102 formed thereon. Conductive layer 102 may be continuous across the surface of plate 100 (e.g., to form a common electrode for the display) or patterned to form a plurality of pixels or sub-pixels for the display. Conductive layer 102 preferably includes a transparent conductor, such as for example, indium tin oxide (ITO), indium zinc oxide (IZO) or any other suitable conductive material, such as opaque conductive materials for display circuitry. Conductive layer 102 may include a plurality of different arrangements or patterns. For example, conductive layer 102 may be adapted for use with twisted nematic (TN), in plane switching (IPS) or any other display mode.

Figure 2:
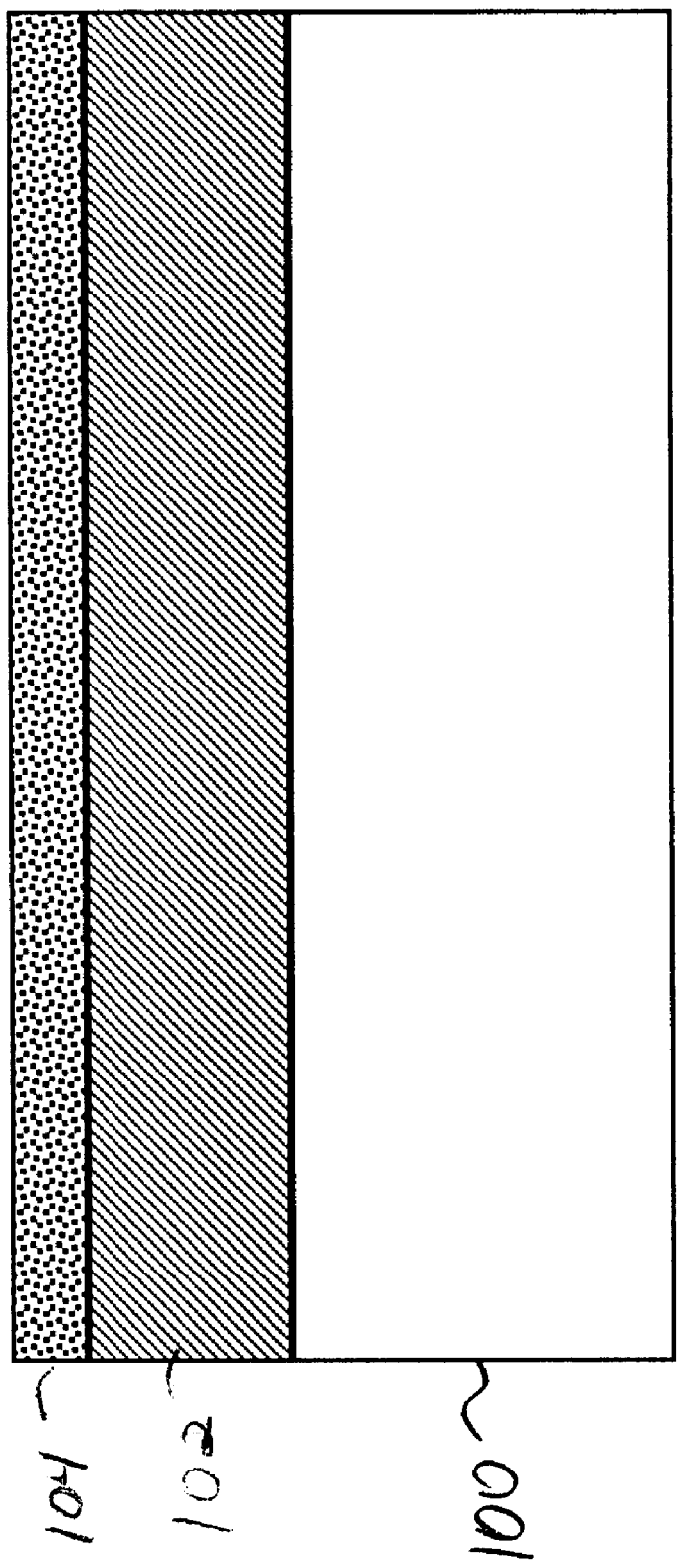
FIG. 2 is a cross-sectional view of the conductive layer of FIG. 1 showing an alignment base layer formed thereon in accordance with the present invention.

Referring to FIG. 2, an alignment layer 104 is formed on conductive layer 102 and on substrate layer 100 in areas not covered by layer 102. It is to be understood that the structure on which alignment base layer 104 is formed is described for illustrative purposes and should not be construed as limiting the present invention. Alignment layer 104 preferably includes carbon, such as, a diamond like carbon (DLC) material, although other polymers may also be employed. In an illustrative embodiment, a DLC alignment film or layer 104 may be deposited in a mixture of $CH_4$ or $C_2H_2$ with either about 2% He or about 2% Ar at a pressure of a few Pascals (e.g., between about 1–5 Pa). The deposition process may include a plasma enhanced chemical vapor deposition process (PECVD), with the radio frequency (RF) power density to generate plasma being about 5 mW/cm$^2$ and the deposition rate being about 3 nm per minute. In this embodiment, the thickness of the film is preferably between about 3 nm and 8 nm, more preferably about 5 nm. It should be understood that a DLC film may be formed on plate 100 by other techniques or methods as well, for example, by sputtering.

Figure 3:
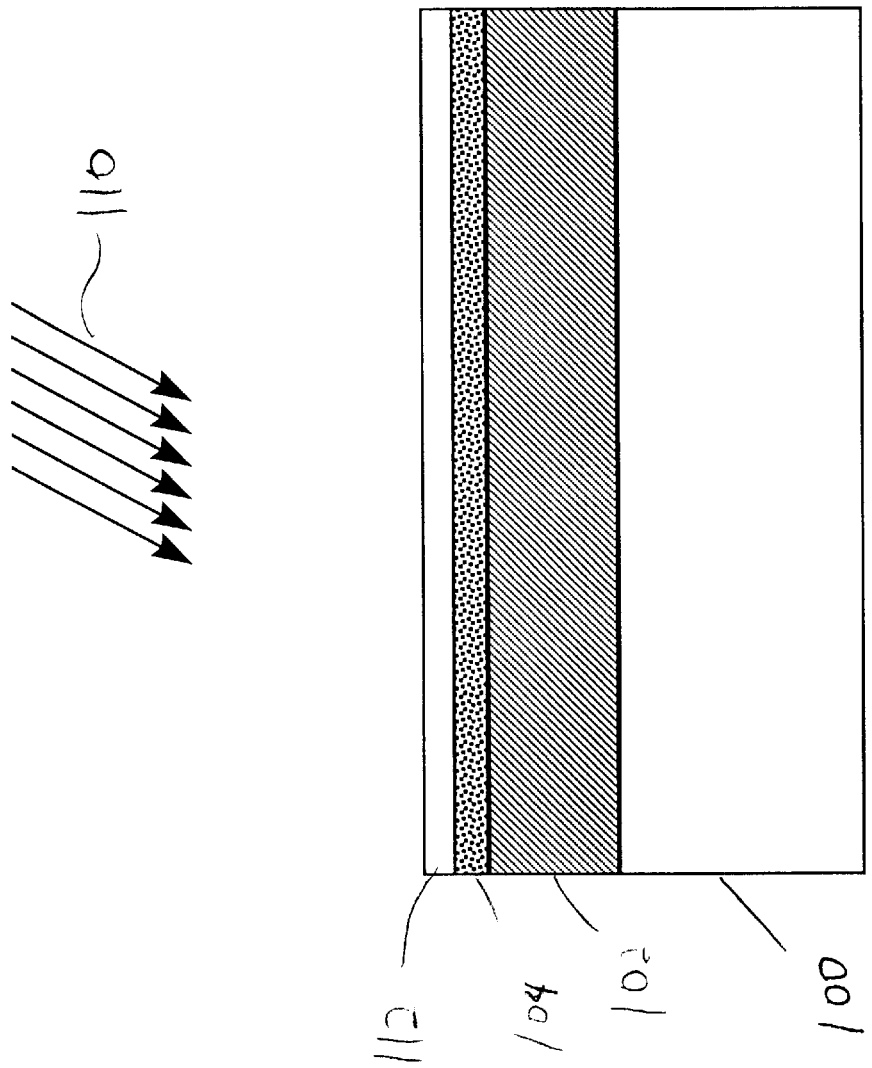
FIG. 3 is a cross-sectional view showing the alignment layer of FIG. 2 being treated by an ion beam treatment with or without the presence of a reactive gas in accordance with the present invention.

Referring to FIG. 3, alignment base layer 104 is treated with an ion beam 110 to create an anisotropic surface or surface alignment layer 112. Surface 112 interacts with the LC (after a display cell is made) and acts as an alignment layer. In one embodiment of the present invention, an additional treatment to the surface alignment layer is carried out simultaneously with ion bombardment. In this embodiment, reactive atomic or molecular species are introduced during the ion bombardment which react with the dangling bonds created on surface 112 by the Argon bombardment. The dangling bonds are then saturated. For instance, if $N_2$ gas is introduced, nitrogen species are incorporated into the uppermost surface layers to create more stable surfaces. Similarly, if hydrogen gas (or dilute hydrogen gas or forming gas) is introduced, hydrogen atoms will saturate the dangling bonds. The species which may be introduced in ion beam 110 to react with dangling bonds during the formation of surface 112 may include nitrogen ($N_2$), fluorine ($F_2$), tetrafluoromethane (($CF_4$) to form polytetrafluoroethylene), hydrogen ($H_2$), silicon (e.g., from silane to form SiC), carbon (C), oxygen ($O_2$). In alternate embodiments, ion beam 110 may include Ar or a mixture of Ar and a reactive gas for saturating dangling bonds, and ion bombardment may be followed by immersing surface 112 in a gas or liquid to saturate dangling bonds.

In one particularly useful embodiment, an ion beam including nitrogen is employed. The nitrogen ion beam may include an energy of between about 180 to 220 eV at a current density of about 100 mA. The ion beam may be incident on a DLC-deposited alignment layer 104 at an angle of about 30–40 degrees from the substrate plane. Irradiation time includes about 20 seconds under these conditions. Since nitrogen is employed in the ion beam, quenching is not needed although quenching may also be performed.

Figure 4:
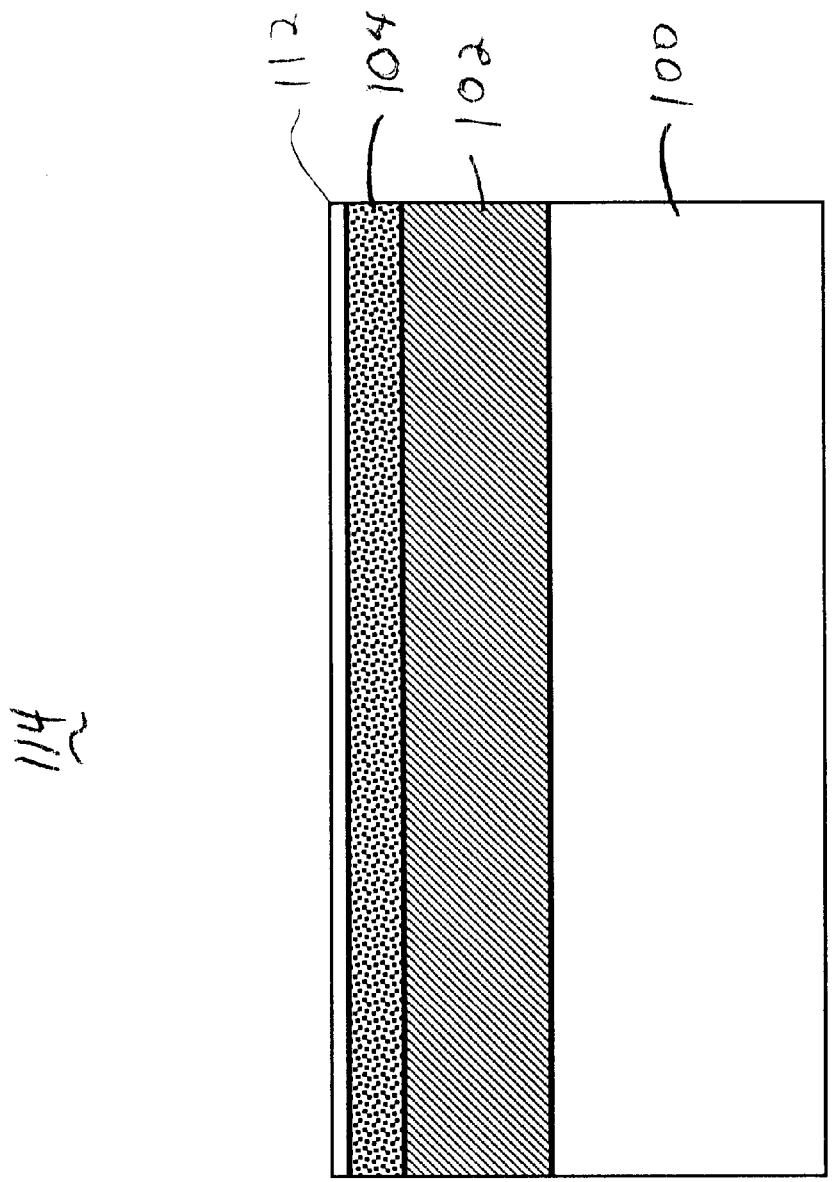
FIG. 4 is a cross-sectional view of an alternate embodiment which shows a quenching step after the ion beam treatment in accordance with the present invention.

Referring to FIG. 4, an additional treatment to surface layer 112 may be carried out subsequent to ion bombardment. Such treatments will hereafter be called "quenching". This treatment may include subjecting surface layer 112 to an ambient chemistry 114, which may include a gas, plasma, atoms (from an atomic gun, see FIG. 5) or liquid. Ambient chemistry 114 preferably includes a gas for a gas phase reaction or a liquid for a liquid phase reaction. As an example of a gas phase reaction, carbon dioxide gas may be introduced into the ion beam chamber following the ion beam process. Any free radicals (dangling bonds) on surface 112 remaining from the IB treatment contact the gas and react to attach to surface 112 via covalent bonds to form a new set of atoms at the very top of surface layer 112. It should be noted that ionic bonds may also be formed during saturation of dangling bonds by the processes of the present invention. The new set of atoms will have a different interactive character with liquid crystal when subsequently made into a liquid crystal display cell than it would have had without the post-IB treatment. Another example includes the introduction of forming gas (diluted hydrogen gas). These gas phase reactions have the advantage of carrying out the controlled reaction of the dangling bonds before the active surface experiences the vagaries of air outside the chamber. In other words, ion bombardment and the gas phase reaction may be carried out in a same chamber, for example, in a vacuum chamber. Other examples of gases which may be employed for gas reaction treatment include dilute hydrogen gas (forming gas 10% $H_2$ in nitrogen gas) carbon dioxide, 20% oxygen in nitrogen, humidified oxygen in nitrogen, humidified nitrogen, nitrogen, etc. Other combinations of gases may include gases containing hydrogen, nitrogen, carbon and oxygen, and may also include any reactive element or molecule existing in the gas phase or an aerosol suspension in a gas stream (e.g., mist is gas, bubbled liquids in gas, etc.).

Liquid ambient chemistry 114 may be carried out after ion bombardment. In this case, the ion beam treated surface layer 112 is removed from the IB chamber and immersed into the quenching liquid. This general approach has the advantage of opening a nearly infinite variety of wet chemistries to perform the quenching and introduce a great variety of surface functional groups. Steps may be taken to prevent surface layer 112 from being exposed to air upon removal from the ion beam chamber, during which some reaction with oxygen, water vapor and organic contaminants may take place. An example of a liquid quenching treatment for ambient chemistry 114 includes dilute hydrogen peroxide in water. Ambient chemistry 114 may include one or more of the following: ethanol, isopropyl alcohol, methanol, benzyl alcohol, other alcohols, water (preferably deionized), dilute hydrogen peroxide, carbon dioxide-saturated water, liquid crystal liquid. Other suitable liquids or solutions may be employed for saturating dangling bonds of surface layer 112. Processing steps after liquid reactions may include drying and annealing.

Figure 5:
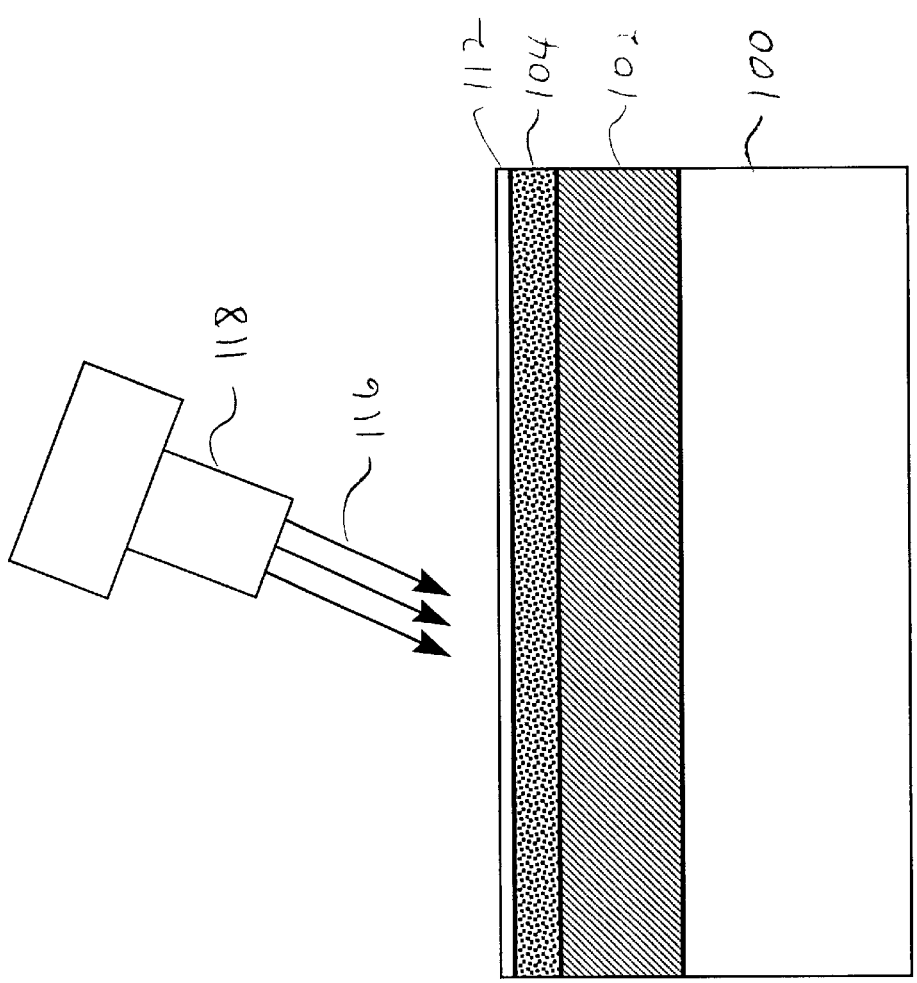
FIG. 5 is a cross-sectional view of an alternate embodiment which shows a quenching step employing atom species from a directed source of atomic species (e.g., an atom gun) after the ion beam treatment in accordance with the present invention.

Referring to FIG. 5, in another embodiment of the present invention, a post-IB quenching may be performed on the structure of FIG. 3 by employing a directed stream of atom species 116 generated by, for example, an atom beam gun 118. Examples of neutral atom species that can be generated in this way include hydrogen, nitrogen, and oxygen atoms, among many others.

The reactivity of atomic species such as hydrogen, nitrogen, and oxygen is known to be higher than the molecular species. The generation of atomic species may be accomplished in a number of ways including a hot filament or a RF excitement of a plasma. To extract only atomic species from the plasma, atom sources have been designed that allow a high fluence of atomic species to be extracted from the plasma while blocking the exit of ionic species. The use of an atomic source is preferred over a hot filament. If atomic species are introduced to surface layer 112, it is preferably to provide a single or double monolayer of the atomic species on surface layer 112.

Figure 6:
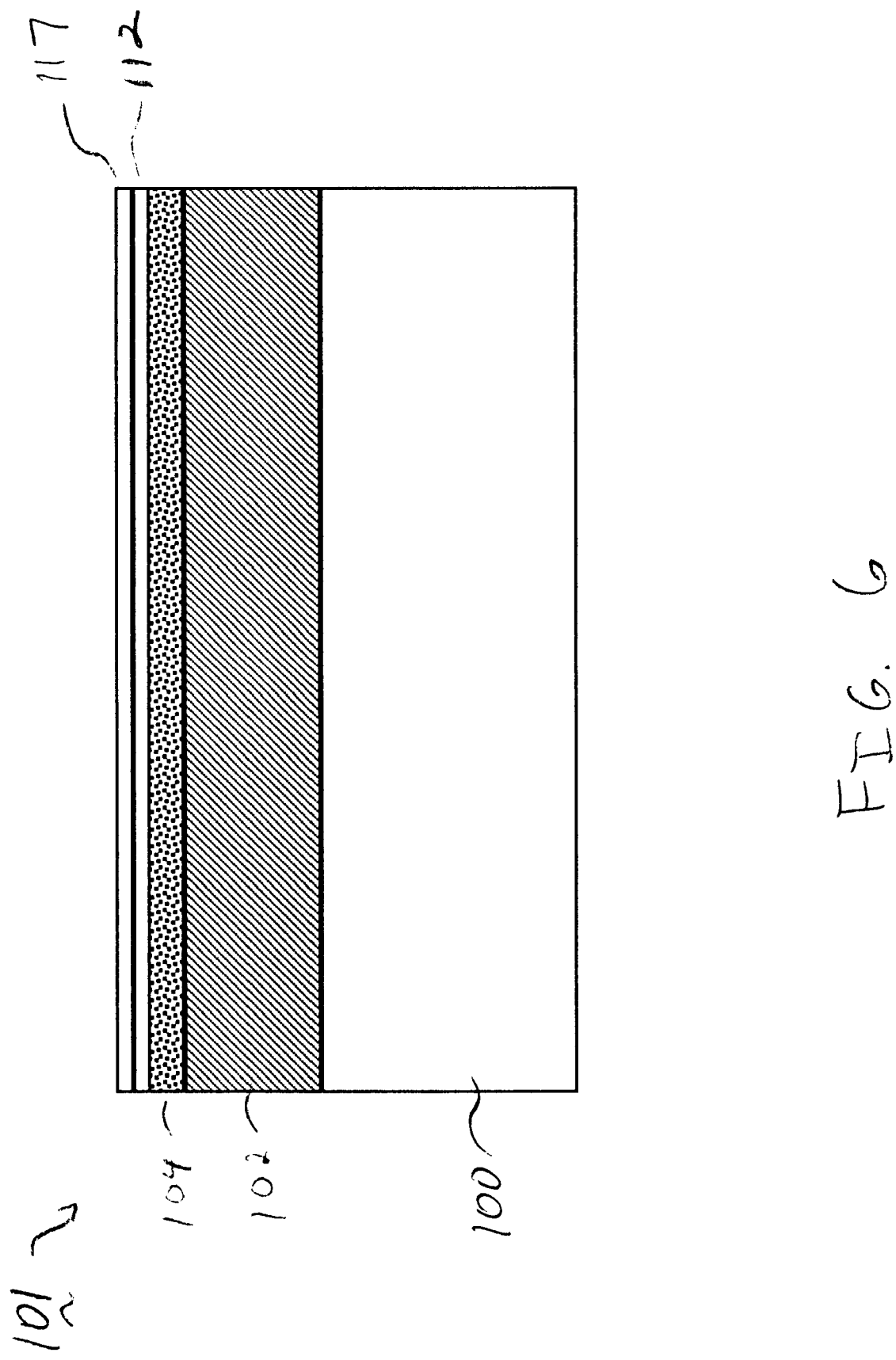
FIG. 6 is a cross-sectional view of the structure of FIGS. 3, 4 or 5 showing a modified surface layer in accordance with the present invention.

Referring to FIG. 6, a chemically modified surface 117 is formed as a result of quenching and/or ion beam treatment in accordance with the present invention. Layer 117 is now substantially free from dangling bonds and free radicals which could degrade properties of a liquid crystal display.

Now, a substrate 101 is formed for use in a liquid crystal display device.

In liquid crystal displays, anchoring energy of liquid crystal on ion beam treated DLC surface is not stable when an Argon beam alone is used. The anchoring energy decreases substantially (about 3 to 10 times) over a period of few weeks for the Ar beam of the prior art. Near Edge X-ray Absorption Spectroscopy (NEXAFS) may be employed to monitor the structural origin of this decrease. NEXAFS measures the surface composition of functional groups and their orientation. The most prevalent functional groups on a DLC surface are carbon—carbon double bonds (C=C), carbonyl (C=O), carboxyl (COOH), carbon—carbon single bonds, and carbon-hydrogen bonds.

It is surmised that the anchoring energy is predominantly determined by the difference in number of C=C bonds with orientation along two orthogonal directions in the surface plane. The relevant directions are parallel and perpendicular to the ion beam incidence direction. The decrease in anchoring energy in accordance with the prior art is a direct result of the chemical modification of the ion beam treated DLC surface. In particular, the measured difference in orientation of C—C bonds progressively decreases with increased exposure to LC. Furthermore, as the LC exposure increases, there is an increase in C—H and carboxyl groups in the bulk of the carbon film. No change is observed in the carbonyl groups.

To understand why the LC reacts with the ion beam treated surface, the effect of ion beam on the DLC surface is considered. The ion beam irradiation breaks bonds at the DLC surface. Since the ion beam is well collimated the bond breaking process has a preferential direction. Thus, an amorphous (in-plane isotropic) surface is converted to surface with asymmetric orientation of chemical bonds. The result is alignment of the liquid crystal along the ion beam incidence direction. In the prior art, this bond breaking process leaves the DLC surface with a lot of dangling bonds (free radicals). It should be noted that these dangling bonds are not just restricted to the surface of the DLC film but do extend into the bulk at a lowered concentration. These dangling bonds are highly reactive and readily react with components within the liquid crystal. These reactions are believed to be the primary cause of the lowered anchoring energy. Advantageously, the present invention substantially lowers these dangling bonds to passivate the ion beam treated surface while preserving the asymmetric orientation of the functional groups present at the surface. This passivation may be performed concurrently with the ion beam treatment or in a quench step immediately following the ion beam treatment.

Figure 7:
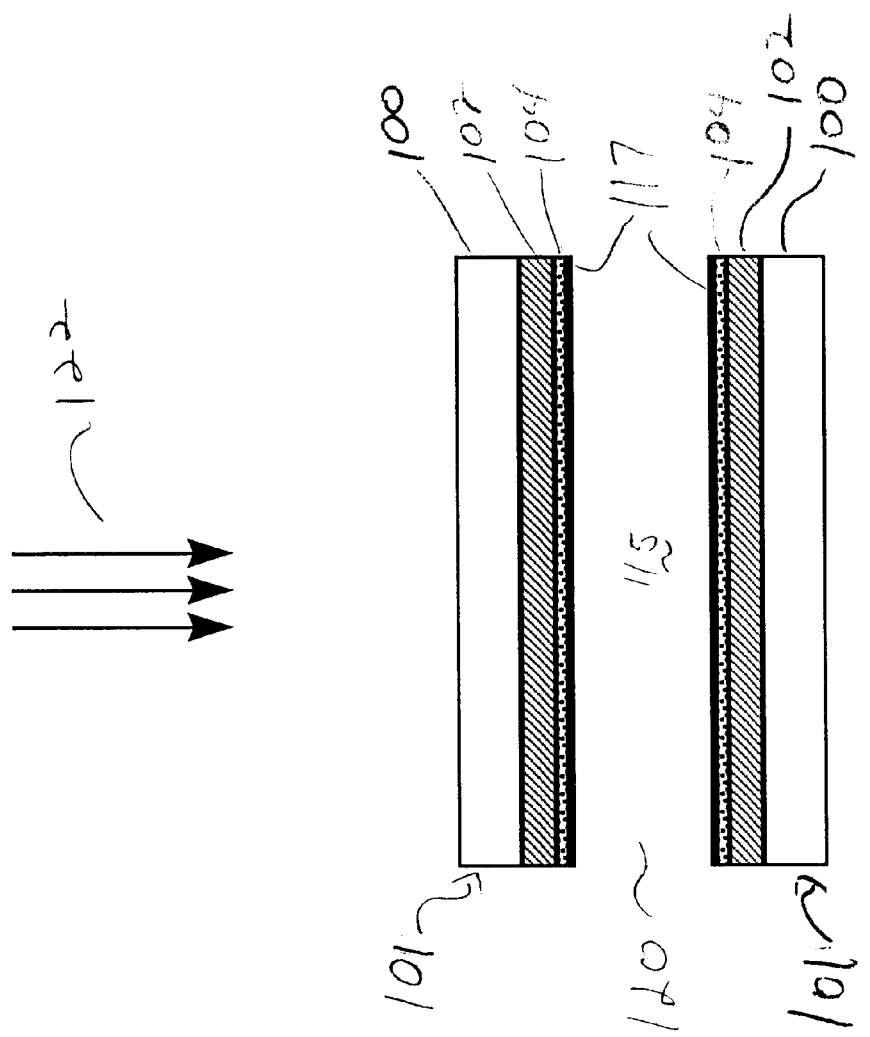
FIG. 7 is a cross-sectional view showing a liquid crystal display in accordance with the present invention.

Referring to FIG. 7, a liquid crystal display device is illustratively shown in accordance with the present invention. A liquid crystal material 115 is disposed in a gap 120 between substrates 101.

An experimental set up for testing the preferred embodiment of the present invention employed by the inventors included two substrates 101 with alignment layers 104 facing each other. Substrates 101 were assembled into reflective 45°-twisted nematic (TN) cells. The cells were subjected to violet light exposure 122 to test for alignment layer stability. To accelerate the aging process, a violet laser of 415 nm was employed. Alignment stability was monitored by measuring the change of electro-optical response of the aged cell after different periods of violet exposure. Samples with $N_2$ ion-beam treatment were compared to the samples with Ar ion-beam treatment. The sample with Ar IB-treatment failed the test within one hour exposure. The life time of the $N_2$ IB-treated samples exceeded 3 hours for all samples tested! A life time of 20 hours was also achieved, which is better than the best Pi-aligned samples ever tested by the inventors. It is believed that nitrogen species (not necessarily ions) react with radicals on the surface of DLC film during $N_2$ IB treatment and form C—N bonds to stabilize the surface. Other tests performed by the inventors confirmed these results.

The surface modification can also be achieved by using ion beams generated by other gases, liquids or elements to stabilize the alignment layer surface. To further improve the anchoring of liquid crystal molecules on amorphous-carbon rings, hydro-carbon or aromatic groups can be attached to the DLC surfaces of an alignment layer.

Figure 8:
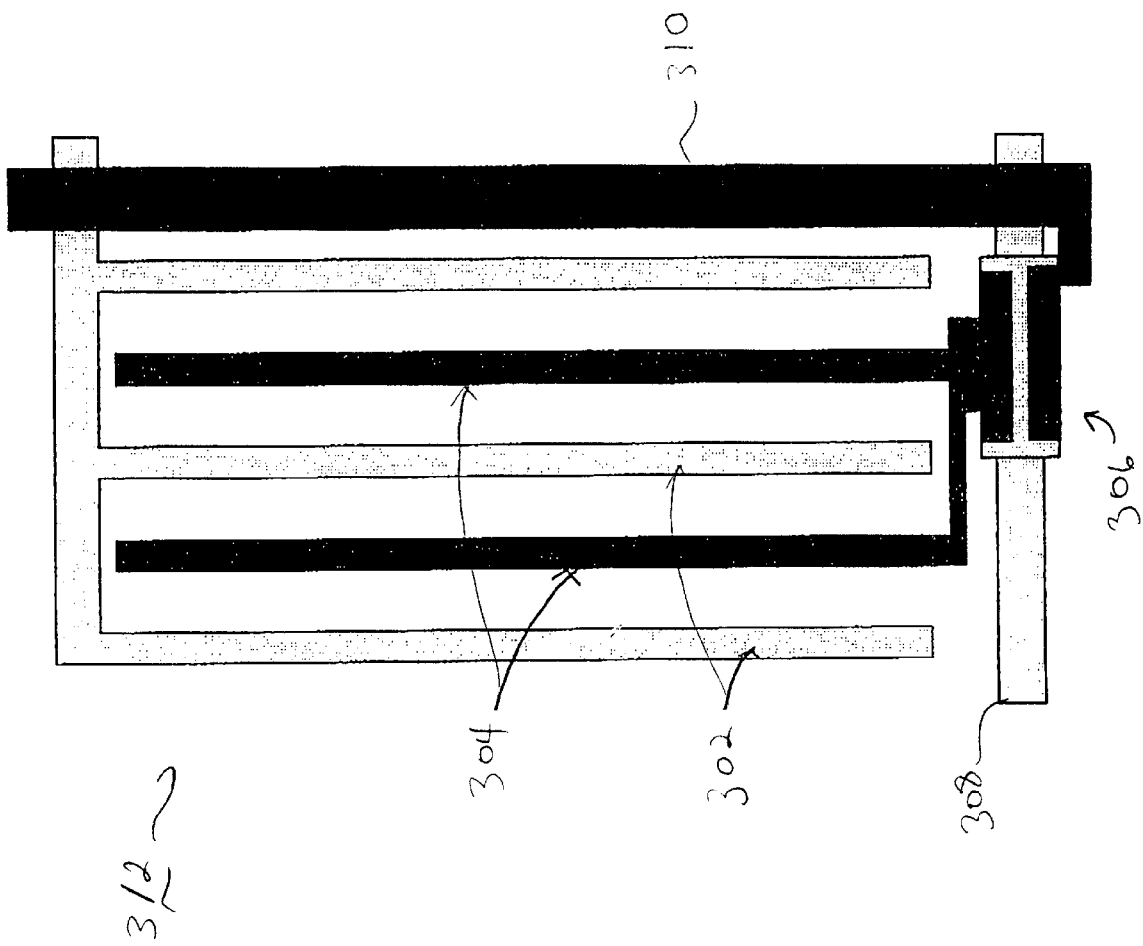
FIG. 8 is a top view of an in plane switching mode structure having an alignment layer formed thereon in accordance with the present invention.
Figure 9:
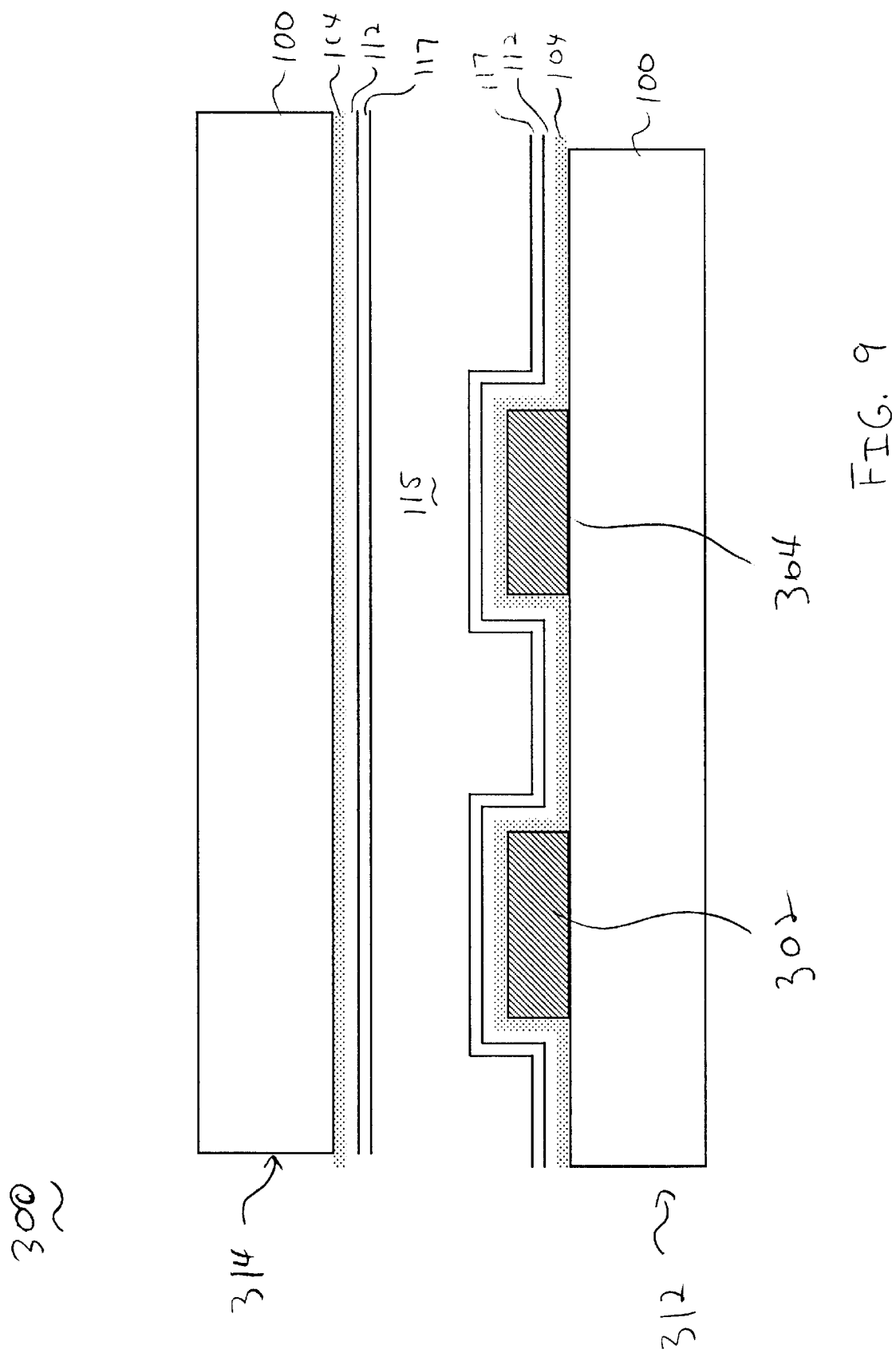
FIG. 9 is a cross-sectional view of the in plane switching mode structure of FIG. 8 showing the alignment layer formed thereon in accordance with the present invention.

Referring to FIGS. 8 and 9, a top view (FIG. 8) of a substrate 312 and a cross-sectional view (FIG. 9) of an in plane switching (IPS) mode display device 300 are illustratively shown. Display 300 includes a plurality of positive electrodes 302 disposed between a plurality of negative electrodes 304 and formed in a same plane. A thin film transistor 306 is illustratively shown for switching negative electrodes 304 in accordance with addressing lines 308 and 310. Electrodes 302 and 304 may be considered part of conductive layer 102, as described above. Base alignment layer 104, surface layer 112 and modified layer 117 are formed as described above on both substrates 312 and 314 on opposite sides of liquid crystal layer 115. Other display mode structures, such as, for example, multiple domain IPS mode structures, etc. may also be employed in accordance with the present invention.

Having described preferred embodiments of improving the stability of ion beam generated alignment layers by surface modification (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for preparing an alignment layer surface, comprising the steps of:

providing a surface on the alignment layer;

bombarding the surface with ions of an ion beam; and introducing reactive gas to the ion beam to saturate dangling bonds on the surface, wherein the reactive gas is at least one of silane and tetrafluoromethane.

2. The method as recited in claim 1, wherein the alignment layer includes diamond like carbon.

3. The method as recited in claim 1, wherein the step of introducing reactive gas components includes the step of introducing nitrogen as the reactive gas.

4. The method as recited in claim 1, wherein the step of introducing reactive gas includes the step of introducing hydrogen as the reactive gas.

5. The method as recited in claim 1, wherein the step of introducing reactive gas includes the step of introducing at least one of oxygen and fluorine as the reactive gas.

6. The method as recited in claim 1, wherein the step of bombarding the surface with ions includes the step of bombarding the surface with Argon ions and reactive gas ions.

* * * * *